United States Patent
Dolev

(10) Patent No.: US 8,046,541 B1
(45) Date of Patent: Oct. 25, 2011

(54) SYSTEM FOR CALIBRATING MEMORY

(75) Inventor: Amir Dolev, Nesher (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 468 days.

(21) Appl. No.: 11/903,034

(22) Filed: Sep. 20, 2007

Related U.S. Application Data

(60) Provisional application No. 60/826,990, filed on Sep. 26, 2006.

(51) Int. Cl.
*G06F 12/00* (2006.01)

(52) U.S. Cl. ........................ 711/154; 711/167; 711/170

(58) Field of Classification Search .................. None
See application file for complete search history.

(56) References Cited

U.S. PATENT DOCUMENTS

| | | | | |
|---|---|---|---|---|
| 5,872,959 A | * | 2/1999 | Nguyen et al. | 713/401 |
| 6,826,658 B1 | * | 11/2004 | Gaither et al. | 711/150 |
| 2005/0135167 A1 | * | 6/2005 | Manabe | 365/201 |

* cited by examiner

*Primary Examiner* — Shawn X Gu

(57) ABSTRACT

A memory integrated circuit (IC) includes first memory implemented by the memory IC. An operation management module implemented by the memory IC generates first initialization data and stores the first initialization data in the first memory before other data is stored in the first memory. Timing alignment of the memory IC is adjusted based on the first initialization data.

14 Claims, 11 Drawing Sheets

SYSTEM FOR CALIBRATING MEMORY

CROSS-REFERENCE TO RELATED APPLICATIONS

This application claims the benefit of U.S. Provisional Application No. 60/826,990, filed on Sep. 26, 2006. The disclosure of the above application is incorporated herein by reference in its entirety.

FIELD

The present disclosure relates to memory devices, and more particularly, to the automatic calibration of data command and data signals in memory devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electronic data storage region devices (i.e. memory devices) are increasingly being required to operate at faster speeds and possess greater storage densities. Host devices such as computers, laptops, personal video recorders (PVRs), MP3 players, game consoles, servers, set-top boxes, digital cameras, and/or other electronic devices employ various types of memory devices to store data to enable operations. Common memory devices include dynamic random access memory (DRAM) devices and static random access memory (SRAM) devices.

In order to operate efficiently, various memory devices use a clock to synchronize input and output signals between memory devices and memory controllers (e.g. processors). Memory devices may use a clock from the memory controller to ensure synchronization during write and read commands that transfer data to and from the memory devices. Memory controllers use various calibration procedures to compensate for variations in parameters among individual memory devices and/or variations within the host devices.

SUMMARY

A memory integrated circuit (IC) includes first memory implemented by said memory IC. An operation management module implemented by the memory IC generates first initialization data and stores the first initialization data in the first memory before other data is stored in the first memory. Timing alignment of the memory IC is adjusted based on the first initialization data.

In other features, a computing system comprising the memory IC further includes a memory controller module that includes second memory and that compares the first initialization data to second initialization data stored in the second memory. The memory controller module adjusts the timing alignment of the other data transmitted from the memory IC based on the comparison. The operation management module reads and transmits the first initialization data to a memory controller module when the operation management module receives a request for a read operation. The operation management module generates the first initialization data after an initialization event. The initialization event includes one of a power-up event and a reset event.

In other features, the first memory stores the other data and the operation management module selectively determines the timing alignment of the other data based on predefined write data and a diagnostic control signal. The diagnostic control signal includes an asynchronous direct current signal. The operation management module samples the predefined write data when the operation management module receives a request for a write operation. The operation management module evaluates the timing alignment based on a comparison of the predefined write data to write initialization data generated by the operation management module. The operation management module transmits a failure signal to a memory controller module when the predefined write data does not equal the write initialization data. The operation management module transmits a pass signal to the memory controller module when the predefined write data equals the write initialization data. The memory controller module adjusts the timing alignment of the other data when the memory controller module receives the failure signal. A computing system includes the memory IC and further includes a memory controller module.

A memory integrated circuit (IC) includes first memory means for storing data and implemented by the memory IC and operation management means implemented by the memory IC for generating first initialization data and for storing the first initialization data in the first memory means before other data is stored in the first memory means. Timing alignment of the memory IC is adjusted based on the first initialization data.

In other features, a computing system includes the memory IC and further includes memory controller means for including second memory means for storing data, and for comparing the first initialization data to second initialization data stored in the second memory means. The memory controller means adjusts the timing alignment of the other data transmitted from the memory IC based on the comparison. The operation management means reads and transmits the first initialization data to memory controller means when the operation management means receives a request for a read operation. The operation management means generates the first initialization data after an initialization event. The initialization event includes one of a power-up event and a reset event.

In other features, the first memory means stores the other data and the operation management means selectively determines the timing alignment of the other data based on predefined write data and a diagnostic control signal. The diagnostic control signal includes an asynchronous direct current signal. The operation management means samples the predefined write data when the operation management means receives a request for a write operation. The operation management means evaluates the timing alignment based on a comparison of the predefined write data to write initialization data generated by the operation management means. The operation management means transmits a failure signal to memory controller means when the predefined write data does not equal the write initialization data. The operation management means transmits a pass signal to the memory controller means when the predefined write data equals the write initialization data. The memory controller means adjusts the timing alignment of the other data when the memory controller means receives the failure signal. A computing system includes the memory IC and further includes memory controller means for controlling the memory IC.

A method of operating a memory integrated circuit (IC) includes generating first initialization data, storing the first initialization data in first memory implemented by the memory IC before other data is stored in the first memory, and adjusting timing alignment of the memory IC based on the first initialization data.

In other features, adjusting the timing alignment includes comparing the first initialization data to second initialization data stored in a second memory that is not implemented by the memory IC. The method further includes receiving a request for a read operation and reading and transmitting the first initialization data to a memory controller module in response to the request. The method further includes generating the first initialization data after an initialization event. The initialization event includes one of a power-up event and a reset event.

In other features, the method further includes storing the other data in the first memory and selectively determining the timing alignment of the other data based on predefined write data and a diagnostic control signal. The method further includes receiving a request for a write operation and sampling the predefined write data in response to the request. The method further includes evaluating the timing alignment based on a comparison of the predefined write data to write initialization data generated by the memory IC. The method further includes transmitting a failure signal to a memory controller module when the predefined write data does not equal the write initialization data. The method further includes transmitting a pass signal to the memory controller module when the predefined write data equals the write initialization data. The method further includes adjusting the timing alignment of the other data when the memory controller module receives the failure signal.

A computer program stored on computer readable medium for use by a processor for operating a memory integrated circuit (IC) includes generating first initialization data, storing the first initialization data in first memory implemented by the memory IC before other data is stored in the first memory, and adjusting timing alignment of the memory IC based on the first initialization data.

In other features, adjusting the timing alignment includes comparing the first initialization data to second initialization data stored in a second memory that is not implemented by the memory IC. The computer program further includes receiving a request for a read operation and reading and transmitting the first initialization data to a memory controller module in response to the request. The computer program further includes generating the first initialization data after an initialization event. The initialization event includes one of a power-up event and a reset event.

In other features, the computer program further includes storing the other data in the first memory and selectively determining the timing alignment of the other data based on predefined write data and a diagnostic control signal. The computer program further includes receiving a request for a write operation and sampling the predefined write data in response to the request. The computer program further includes evaluating the timing alignment based on a comparison of the predefined write data to write initialization data generated by the memory IC. The computer program further includes transmitting a failure signal to a memory controller module when the predefined write data does not equal the write initialization data. The computer program further includes transmitting a pass signal to the memory controller module when the predefined write data equals the write initialization data. The computer program further includes adjusting the timing alignment of the other data when the memory controller module receives the failure signal.

In still other features, the systems and methods described above are implemented by a computer program executed by one or more processors. The computer program can reside on a computer readable medium such as but not limited to memory, non-volatile data storage region and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
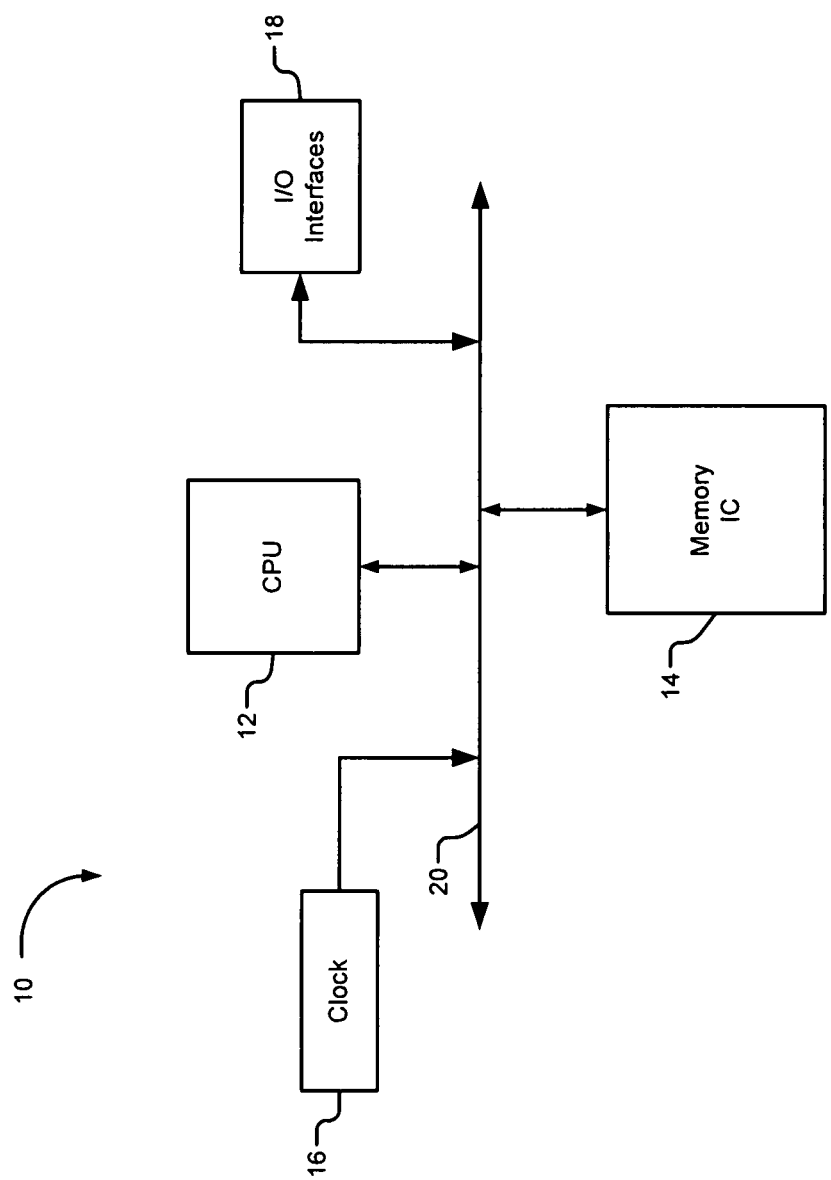
FIG. 1 is a functional block diagram of an exemplary computing device according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Conventional synchronization techniques used by memory controllers include transmitting a predetermined bit sequence to the memory devices via a read/write data bus and an address data bus while transitioning a clock signal. The memory devices generate an internal delay for the clock signal based on the incoming data and address values. The memory device varies the internal delay until the memory device achieves a desired alignment of the bit sequence relative to the clock signal. Typically, the memory controller uses several hardware and software resources of the memory controller and may require the clock frequency to be decreased to perform synchronization. The memory calibration system enables the memory device to initiate calibration of data relative to a clock signal, thereby establishing timing alignment and synchronizing communication between the memory controller and memory device more efficiently.

Referring now to FIG. 1, an exemplary computing system 10 that implements a memory calibration system is shown to include a central processing unit (CPU) 12, a memory system and/or module such as a memory integrated circuit (IC) 14, a clock 16, input/output (I/O) interfaces 18, and a bus 20. Those skilled in the art can appreciate that various other implementations of the memory calibration system are contemplated within other devices such as laptops, personal video recorders (PVRs), MP3 players, game consoles, servers, set-top boxes, digital cameras, and/or other electronic devices.

The CPU 12 communicates with the memory IC 14, the clock 16, and the I/O interfaces 18 via the bus 20. The bus 20 can include a data bus, address bus, and/or a command bus. The CPU 12 interprets and executes instructions and processes data stored in the memory IC 14. The CPU 12 operates at a rate determined by the clock 16.

In the present implementation, the memory IC 14 implements the memory calibration system. The memory IC 14 stores read, write, and/or volatile control data associated with the control of the computing system 10. The memory IC 14 may employ volatile and non-volatile memory. For example, non-volatile memory can include, but is not limited to, read-only memory (ROM) and flash memory. Volatile memory implemented in the computing system 10 can include, but is not limited to, various forms of random access memory (e.g. static random access memory and dynamic random access memory).

Figure 2A:
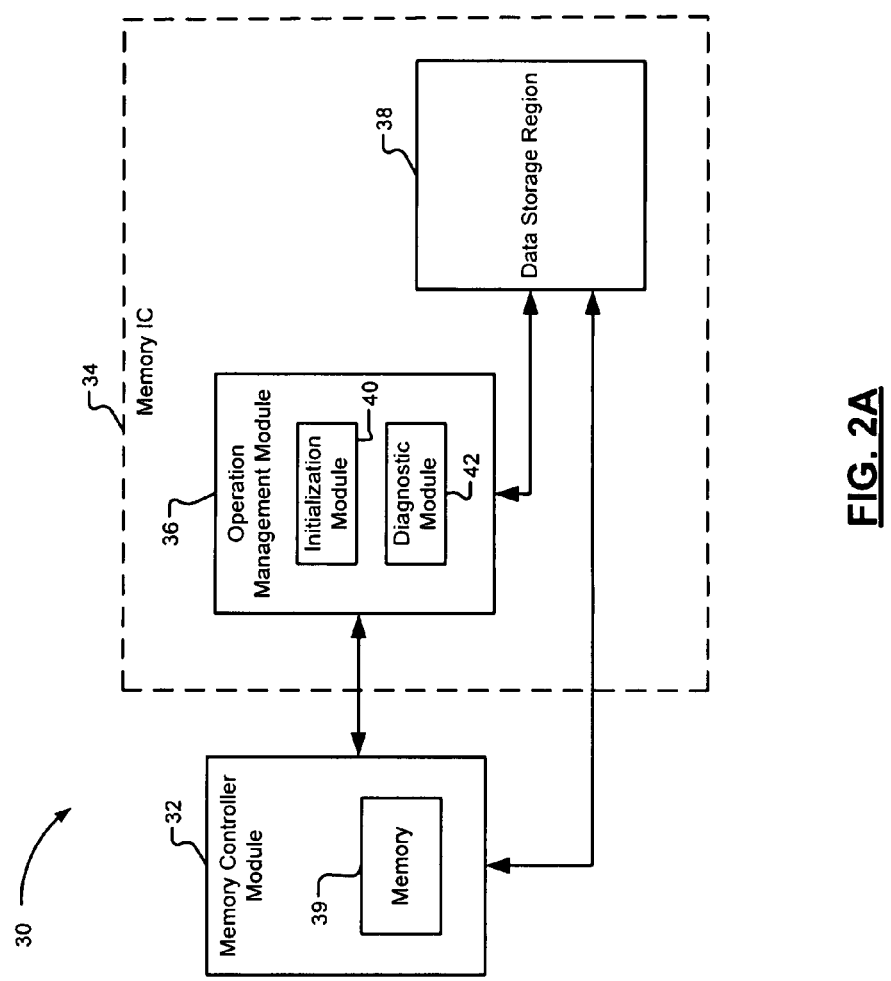
FIG. 2A is a functional block diagram of a memory system according to the present disclosure.

Referring now to FIG. 2A, an exemplary memory system 30 implementing the memory calibration system is shown to include a memory controller module 32 and a memory IC 34. The memory controller module 32 can include, but is not limited to, a CPU or a direct memory access (DMA) controller. The memory IC 34 includes an operation management module 36 and a data storage region 38. The memory controller module 32 accesses the memory IC 34 and interprets and executes instructions and processes data stored in the data storage region 38. The memory controller module 32 includes memory 39 for storing data.

Generally, a logical state of volatile memories is undefined immediately following a system initialization event (e.g. power-up or reset). Therefore, memory controllers execute several initialization operations on memory ICs in order to ensure proper operation of the memory controllers within a system. The initialization operations compensate for variations among device constraints of the system and/or the system design. Initialization operations can include, but are not limited to, executing register set commands, pre-charging banks, and/or executing refresh commands.

During normal operation, the memory controller module 32 decreases the data transfer rate between the memory controller module 32 and the memory IC 34. Typically, the decreased data transfer rate corresponds to an increase in data capture time, thereby decreasing the likelihood of alignment problems associated with data transmissions to the memory IC 34. The memory controller module 32 proceeds to perform a plurality of independent write operations to the memory IC 34. Assuming the memory IC 34 receives valid write data during the write operations, the memory controller module 32 reinstates the normal data transfer rate and calibrates a "read interface" (i.e. timing of outgoing data and associated address) of the memory IC 34 based on read operations of the write data stored in the data storage region 38.

The memory controller module 32 adjusts the timing alignment of the read interface until the data sampled from the memory IC 34 corresponds to the write data initially transmitted to the memory IC 34. The memory controller module 32 calibrates a "write interface" (i.e. timing of incoming data and associated address) of the memory IC 34 by carrying out additional data writes to the memory IC 34. The memory controller module 32 validates the timing alignment of the write interface of the memory IC 34 based on receiving valid data from the memory IC 34 during subsequent read operations.

However, in the present implementation, a memory calibration system provides predefined initialization data to the memory IC 34 upon initialization, thereby enabling the memory controller module 32 to calibrate read and write interfaces of the memory IC 34 at data transfer rates consistent with data transfer rates used during normal read and write accesses to the memory IC 34.

The operation management module 36 implements the memory calibration system. In the present implementation, the operation management module 36 includes an initialization module 40 and a diagnostic module 42. The operation management module 36 communicates with the memory controller module 32. The initialization module 40 initializes the data storage region 38 with predefined initialization data. The operation management module 36 selectively calibrates the timing synchronization between a clock signal of a clock (not shown) and data transmitted via read and/or write interfaces of the memory IC 34.

Upon the execution of the various initialization operations by the memory controller module 32, the initialization module 40 performs a write operation of predefined initialization data to the data storage region 38. In other words, the memory IC 34 itself provides the initialization data to the data storage region 38. As such, timing synchronization between the memory IC 34 and an external device such as the memory controller module 32 is not required. Consequently, upon initialization the data storage region 38 includes data (i.e. the initialization data) that is known to be valid. Typically, upon initialization of a memory IC no data is stored in the data storage region 38 prior to calibration and alignment (e.g. the data storage region 38 is undefined), and an initial write operation to write data to the memory IC 34 is required to calibrate the read and write interfaces.

In the present implementation, the initialization module 40 initializes at least one element (not shown) of the data storage region 38, though it is anticipated that initialization module 40 may initialize a variable number of elements of the data storage region 38. In various embodiments, the predefined initialization data can be specified by a manufacturer of the system, manufacturer of the memory IC 34, or a value on the data bus during system initialization.

Upon performing the write operation of the predefined initialization data, the operation management module 36 selectively activates a diagnostic mode of the memory calibration system based on input received from the memory controller module 32. The diagnostic mode enables the memory calibration system to synchronize the write interface of the memory IC 34 relative to the clock independent of any synchronization of the read interface. Preferably, a diagnostic control signal indicating the activation of the diagnostic mode includes an asynchronous direct current (DC) signal.

While operating in the diagnostic mode, the operation management module 36 determines whether to perform a write interface or read interface calibration based on input provided from a memory controller module 32. During a write calibration (i.e. calibration of incoming data to the memory IC 34), the diagnostic module 42 samples predefined write data transmitted from the memory controller module 32. In the present implementation, the diagnostic module 42 independently generates internal write initialization data (i.e. second write initialization data). The diagnostic module 42 compares the write initialization data transmitted from the memory controller module 32 to the second write initialization data. The diagnostic module 42 uses the second write initialization data to verify the integrity of the timing alignment of the write interface of the memory IC 34. When a disparity exists between the write data and the second write initialization data, the diagnostic module 42 generates and transmits an operation signal (i.e. "failure" signal) to the memory controller module 32. The failure signal indicates that the operation management module 36 failed to receive a sample of the write data consistent with the second write initialization data.

The memory controller module 32 then adjusts the timing of the transmission of the predefined write data relative to the clock based on receiving the failure signal from the diagnostic module 42. In various embodiments, the memory controller module 32 and the diagnostic module 42 may execute several iterations of the write operation prior to establishing a properly synchronized the write interface.

While calibrating the read interface during the diagnostic mode, the memory controller module 32 requests transmission of the predetermined initialization data stored within the data storage region 38. In the present implementation, the memory controller module 32 may arbitrarily request the initialization data stored in any element of the data storage region 38. The memory controller module 32 compares the initialization data received from the memory IC 34 to second initialization data generated internally by the memory controller module 32. The second initialization data corresponds to the predefined initialization data that the operation management module writes to the data storage region 38. For example, the memory controller module 32 may store the second initialization data in memory 39.

The memory controller module 32 calibrates (i.e. adjusts) the timing alignment of the read interface of the memory IC 34 based on the comparison between the initialization data retrieved from the memory IC 34 and the second initialization data generated by the memory controller module 32. In other words, the memory controller module 32 determines whether the initialization data read from the memory IC 34 corresponds to the second initialization data and adjusts the read interface timing accordingly. In various embodiments, the memory controller module 32 may execute a plurality of calibration operations to ensure proper calibration of the read interface of the memory IC 34. The memory controller module 32 may elect not to activate the diagnostic mode and instead calibrates the write interface of the memory IC 34 during normal operations as discussed above.

Figure 2B:
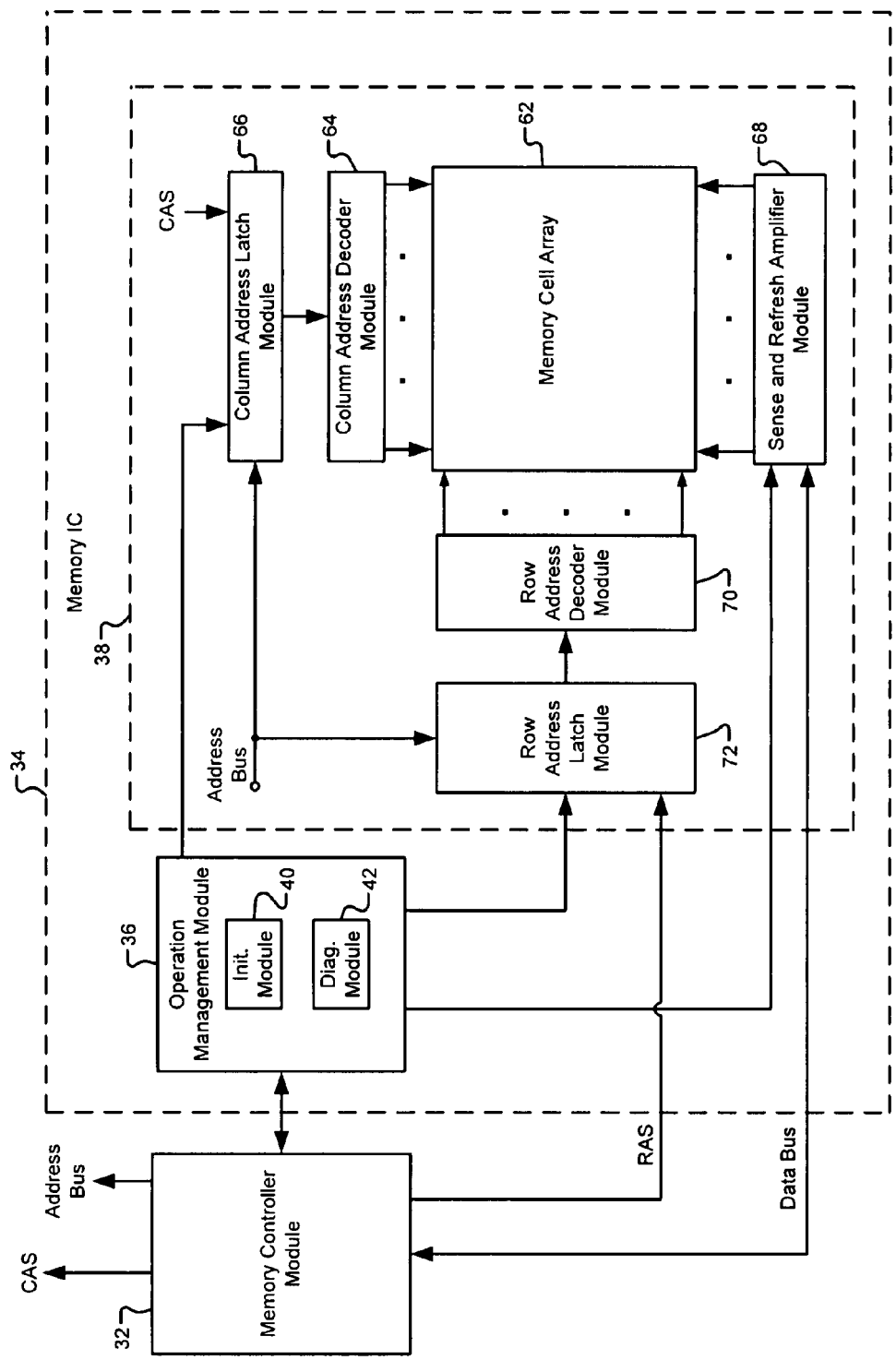
FIG. 2B is a function block diagram of an exemplary dynamic random access memory according to the present disclosure.

Referring now to FIG. 2B, the memory IC 34 that implements the memory calibration system is shown in more detail. Though the present embodiment of the data storage region 38 depicts DRAM architecture, those skilled in the art will appreciate that other architectures are contemplated.

The data storage region 38 includes a memory cell array 62, a column address decoder module 64, a column address latch module 66, a sense and refresh amplifier (SRA) module 68, a row address decoder module 70, a row address latch module 72, and the operation management module 36. During write and read operations, the memory controller module 32 selectively transmits an address (e.g. a row address and a column address) via an address bus to access a desired memory cell of the memory cell array 62. Typically, the memory controller module 32 transmits the row and column addresses of a desired memory cell on two consecutive clock cycles. The column address latch module 66 and row address latch module 72 respectively receive the column address and row address. The column address latch module 66 latches and resolves the column address when the column address latch module 66 receives an active column address strobe (CAS). The row address latch module 72 latches and resolves the row address based on receiving an active row address strobe (RAS). Additionally, the memory IC 34 uses the RAS to initiate and terminate read and write operations. The CAS also serves to initiate and read and write operations.

The column address latch module 66 and the row address latch module 72 communicate with the column address decoder module 64 and the row address decoder module 70, respectively. The column and row address decoders 66 and 72 respectively decode and selectively activate the desired memory cell based on the CAS and RAS, respectively.

The SRA module 68 communicates with the memory cell array 62. During read operations, the SRA module 68 senses and amplifies the charge (i.e. data) stored within the memory cells and places "read data" (i.e. outgoing data) at a data output pin (not shown). A data bus then transmits the read data to the memory controller module 32 via a data bus. Additionally, a write enable signal (not shown) is set inactive, notifying the memory IC 34 of a read operation.

During write operations, the memory controller module 32 generates write data and transmits "write data" (i.e. incoming data) to an input pin (not shown) via the data bus. The SRA module 68 then writes the write data to a selected memory cell based on receiving a write enable signal.

The SRA module 68 also serves to refresh the memory cells of the cell array 60. Each memory cell of the memory cell array 60 includes a switching element such as a transistor and a storage element such as a capacitor. The storage element is charged to produce a binary value based on data transmitted from memory controller module 32. Charge on the memory cells can "leak" away over a period of time. Therefore, the charge contained within individual memory cells must be periodically refreshed by the SRA module 68 during a refreshing cycle.

As discussed above with reference to FIG. 2A, the operation management module 36 implements the memory calibration system. In the present implementation, the operation management module 36 communicates with the column address latch module 66, the row address latch module 72, and the memory controller module 32. The initialization module 40 controls an initialization of the memory cells of the memory cell array 62. Additionally, the operation management module 36 selectively calibrates the timing synchronization between a clock signal of a clock (not shown) and data transmitted via read and/or write interfaces of the memory IC 34. Upon the execution of the various initialization operations, the initialization module 40 performs a write operation of predefined initialization data to the data storage region 38. In the present embodiment, the initialization module 40 initializes at least one element of the data storage region 38 though it is anticipated that operation management module 36 may initialize a variable number of elements of the data storage region 38.

In various embodiments, the diagnostic module 42 and initialization module 40 may be integrated by an existing IC and/or by additional ICs.

Figure 3A:
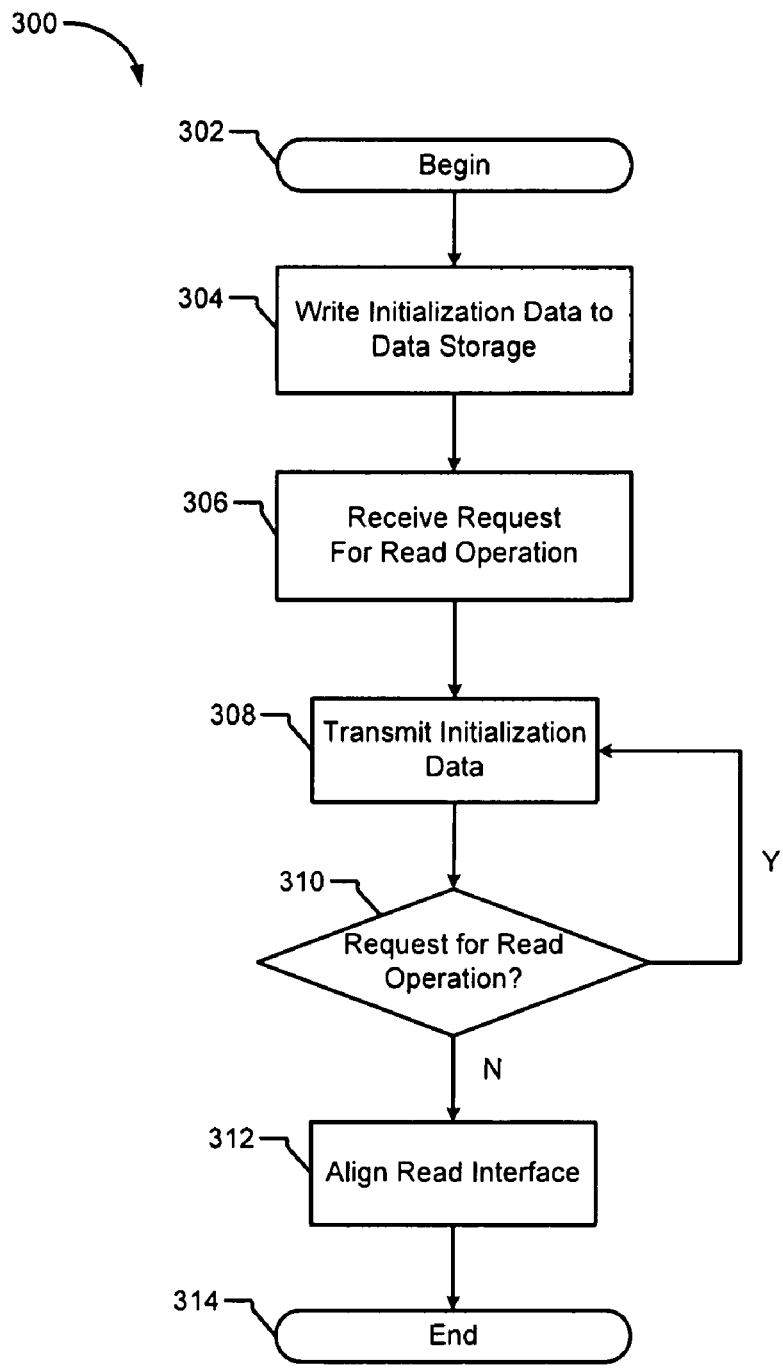
FIG. 3A is a flow diagram illustrating steps of calibrating a read interface of the memory system of the present disclosure.

Referring now to FIG. 3A, a method 300 for calibrating the read interface of the memory IC 34 is shown in more detail. The method 300 begins in step 302. In step 304, the initialization module 40 writes predefined initialization data to the data storage region 38. In step 306, the operation management module 36 receives a request for a read operation from the memory controller module 32. In step 308, the operation management module 36 transmits the initialization data read from one or more desired elements of the data storage region 38. In step 310, the operation management module 36 determines whether the memory controller module 32 has requested another read operation from the data storage region 38. If the operation management module 36 receives another request for a read operation, the operation management module 36 returns to step 308. If the operation management module 36 does not receive another request for a read operation, the operation management module 36 proceeds to step 312. In step 312, the memory controller module 32 aligns the read interface based on the initialization data read from the data storage region 38 (e.g. based on a comparison between the initialization data and second initialization data stored on the memory controller module 32). The method 300 ends in step 314.

Figure 3B:
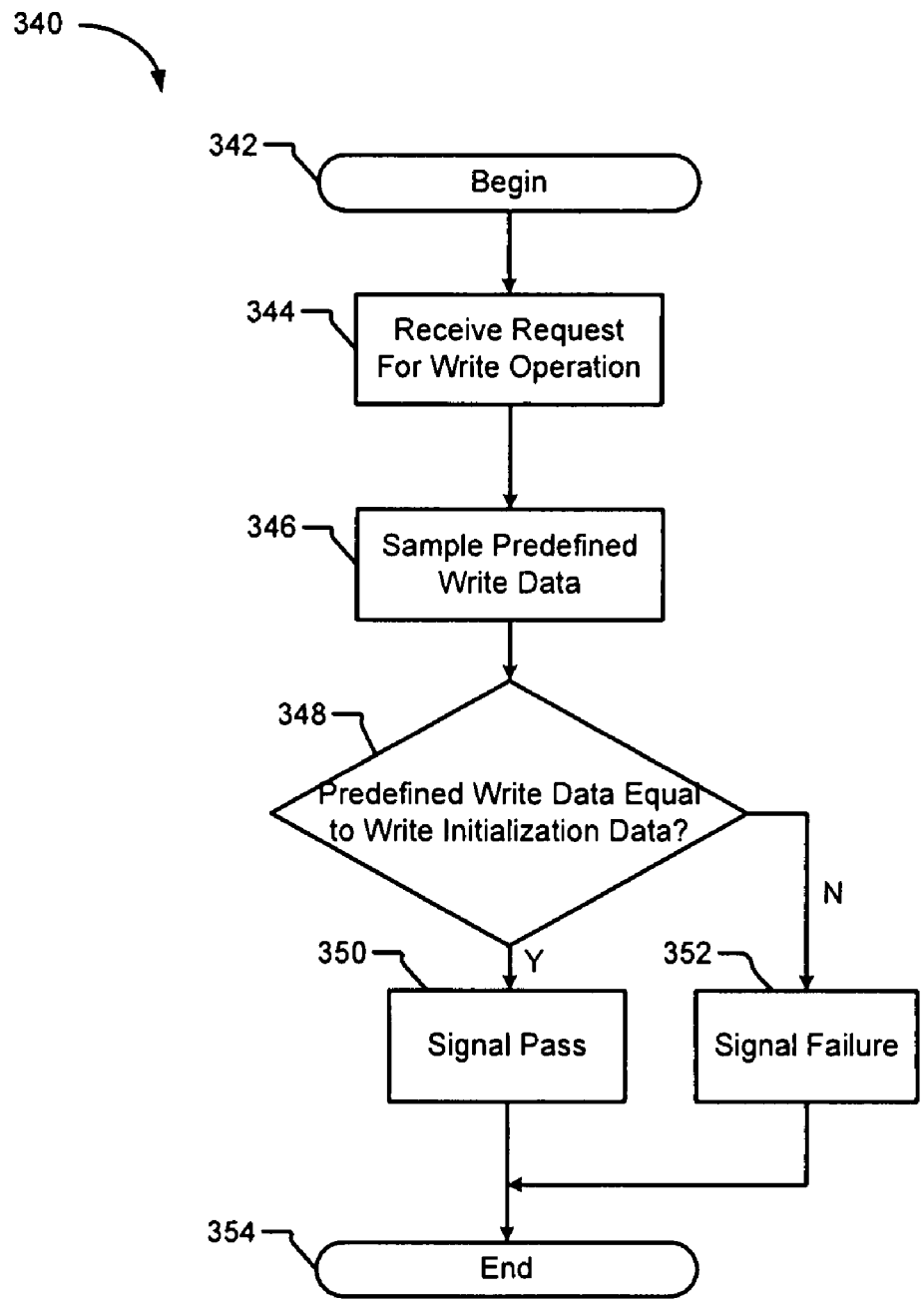
FIG. 3B is a flow diagram illustrating steps of calibrating the write interface of the memory system of the present disclosure.

Referring now to FIG. 3B, a method 340 for calibrating the write interface of the memory IC 34 is shown in more detail. The method 340 begins in step 342. In step 344, the operation management module 36 receives a request for a write operation from the memory controller module 32. In step 346, the diagnostic module 42 samples predefined write data transmitted from the memory controller module 32.

In step 348, the diagnostic module 42 determines whether the predefined write data equates to write initialization data of the operation management module 36. For example, the diagnostic module 42 may include expected write initialization data that is stored and/or acquired during power up initialization. In other words, the write initialization data is data that the diagnostic module 42 expects to correspond to the predefined data transmitted from the memory controller module 32. The diagnostic module 42 compares the predefined write data to the write initialization data. If the predefined write data sampled by the operation management module 36 is equivalent to the write initialization data, the operation management module 36 proceeds to step 350. If the predefined write data is not equivalent to the write initialization data, the operation management module 36 proceeds to step 352.

In step 350, the operation management module 36 transmits a pass signal to the memory controller module 32 indicating that the write interface of the memory IC 34 is properly aligned. In step 352, the operation management module 36 transmits a failure signal to the memory controller module 32 indicating that the operation management module 36 failed to properly sample the predefined write data. In other words, the write interface of the memory IC 34 is not properly aligned. In the present implementation, the memory controller module 32 further adjusts the timing alignment of the predefined write data relative to the clock based on receiving the failure signal from the operation management module 36. In step 354, the method 340 ends.

Figure 3C:
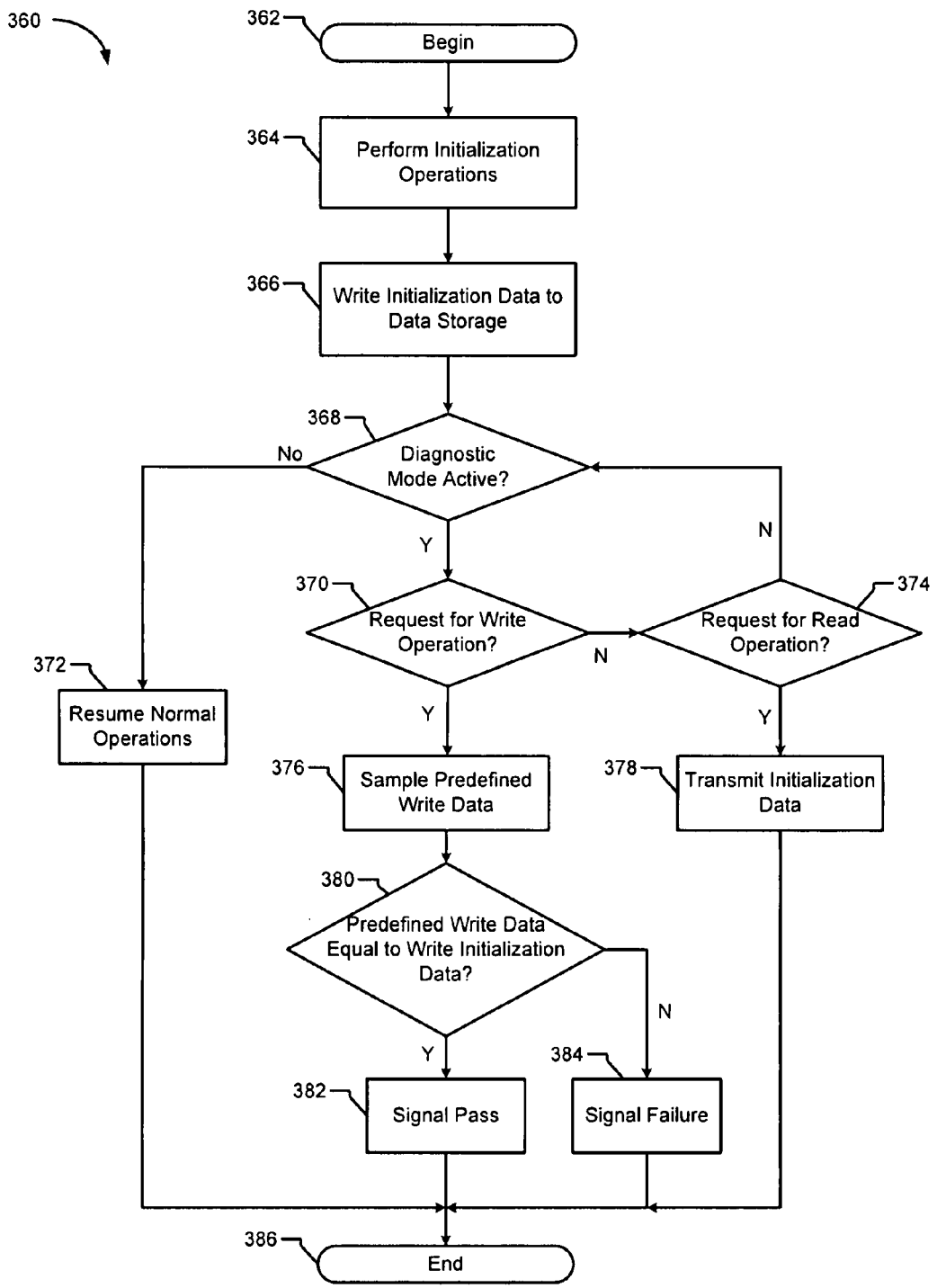
FIG. 3C is a flow diagram illustrating steps of executing the memory calibration system of the present disclosure.

Referring now to FIG. 3C, a method 360 for operating the memory calibration system in a computing system is shown in more detail. The method 360 begins in step 362. In step 364, the memory controller module 32 performs a sequence of initialization operations. In step 366, the initialization module 40 writes initialization data to the data storage region 38. In step 368, the operation management module 36 determines whether the operation management module 36 received an activation signal of the diagnostic mode (i.e. diagnostic control signal) from the memory controller module 32. If the operation management module 36 receives a diagnostic control signal, the operation management module 36 proceeds to step 370. If the operation management module 36 fails to receive a diagnostic signal, the method 340 proceeds to step 372.

In step 372, the memory controller module 32 resumes normal operation as discussed above with reference to FIG. 2A. In step 370, the operation management module 36 determines whether the memory controller module 32 has asserted a request for a write operation. If the memory controller module 32 has not asserted a request for a write operation, the operation management module 36 proceeds to step 374. If the memory controller module 32 has asserted a request for a write operation, the operation management module 36 proceeds to step 376.

In step 374, the operation management module 36 determines whether the memory controller module 32 has asserted a request for a read operation. If the memory controller module 32 has not asserted a request for a read operation, the operation management module 36 returns to step 368. If the memory controller module 32 has asserted a request for a read operation, the operation management module 36 proceeds to step 378. In step 378, the operation management module 36 transmits the initialization data read from one or more desired elements of the data storage region 38 to the memory controller module 32.

In step 376, the operation management module 36 samples predefined write data transmitted from the memory controller module 32. In step 380, the operation management module 36 determines whether the predefined write data equals write initialization data of the operation management module 36. If the predefined write data sampled by the operation management module 36 is equivalent to the write initialization data, the operation management module 36 proceeds to step 382. However, if the predefined write data is not equal to the write initialization data, the operation management module 36 proceeds to step 384.

In step 382, the operation management module 36 transmits a pass signal to the memory controller module 32 indicating that the write interface of the memory IC 34 is properly aligned. In step 384, the operation management module 36 transmits a failure signal to the memory controller module 32 indicating that the operation management module 36 failed to properly sample the predefined write data. Therefore the write interface of the memory IC 34 is not properly aligned. In the present implementation, the memory controller module 32 further adjusts the timing alignment of the predefined write data relative to the clock based on receiving the failure signal from the operation management module 36. In step 386, the method 360 ends.

Figure 4:
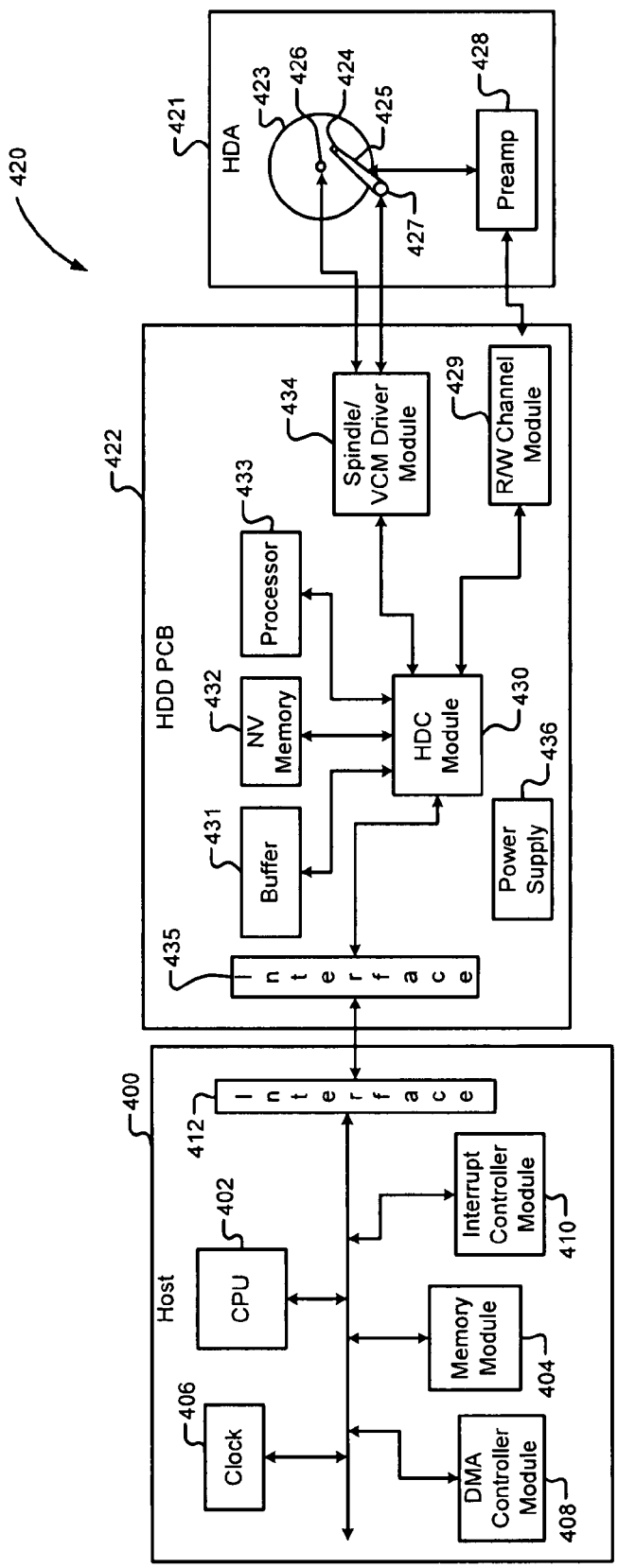
FIG. 4 is a function block diagram of an exemplary host system and hard disk drive system according to the present disclosure.

Referring now to FIG. 4, the memory calibration system may be implemented in an exemplary host device 400 and/or an exemplary hard disk drive (HDD) 420. The host device 400 includes a CPU 402, a memory system and/or module such as a memory IC 404, a clock 406, DMA controller module 408, an interrupt controller module 410, and an interface 412. The CPU 402 interprets and executes control instructions and processes data related to the operation of the host device 400. Typically, the memory IC 404 stores the control instructions and data.

The clock 406 generates a series of pulses that are transmitted to the CPU 402. The CPU 402 performs and/or controls various operations based on the series of clock pulses.

The DMA controller module 408 controls data movement directly between the memory IC 404 and external devices, thereby freeing the CPU 402 from involvement with various data transfer operations. The interrupt controller module 410 receives interrupts from external devices such as the HDD 420 and notifies the CPU 402. The interrupt controller module 410 prioritizes various interrupt requests enabling efficient data transfers to the host 400.

The memory IC 404 may implement the memory calibration system. The memory IC 404 stores read, write, and/or volatile control data that is associated with the control of the host system 400. The memory IC 404 may employ volatile and non-volatile memory. For example, non-volatile memory can include, but is not limited to, read-only memory (ROM) and flash memory. Volatile memory implemented in the computing system 10 can include, but is not limited to, various forms of random access memory (e.g. static random access memory and dynamic random access memory).

The HDD 420 includes a hard disk assembly (HDA) 421 and a HDD printed circuit board (PCB) 422. The HDD 421 may include a magnetic medium 423, such as one or more platters that store data, and a read/write device 424. The read/write device 424 may be arranged on an actuator arm 425 and may read and write data on the magnetic medium 423. Additionally, the HDD 421 includes a spindle motor 426 that rotates the magnetic medium 423 and a voice-coil motor (VCM) 427 that actuates the actuator arm 425. A preamplifier device 428 amplifies signals generated by the read/write device 424 during read operations and provides signals to the read/write device 424 during write operations.

The HDD PCB 422 includes a read/write channel module (hereinafter, "read channel") 429, a hard disk controller (HDC) module 430, a buffer 431, nonvolatile memory 432, a processor 433, and a spindle/VCM driver module 434. The read channel 429 processes data received from and transmitted to the preamplifier device 428. The HDC module 430 controls components of the HDD 421 and communicates with the host 400 via an I/O interface 435. The external device may include a computer, a multimedia device, a mobile computing device, etc. The I/O interface 435 may include wireline and/or wireless communication links.

The HDC module 430 may receive data from the HDD 421, the read channel 429, the buffer 431, nonvolatile memory 432, the processor 433, the spindle/VCM driver module 434, and/or the I/O interface 435. The processor 433 may process the data, including encoding, decoding, filtering, and/or formatting. The processed data may be output to the HDD 421, the read channel 429, the buffer 431, nonvolatile memory 432, the processor 433, the spindle/VCM driver module 434, and/or the I/O interface 435.

The HDC module 430 may use the buffer 431 and/or nonvolatile memory 432 to store data related to the control and operation of the HDD 420. The buffer 431 may implement the memory calibration system. The buffer 431 may include DRAM, SDRAM, etc. The nonvolatile memory 432 may include flash memory (including NAND and NOR flash memory), phase change memory, magnetic RAM, or multi-state memory, in which each memory cell has more than two states. The spindle/VCM driver module 434 controls the spindle motor 426 and the VCM 427. The HDD PCB 422 includes a power supply 436 that provides power to the components of the HDD 420.

Figure 5A:
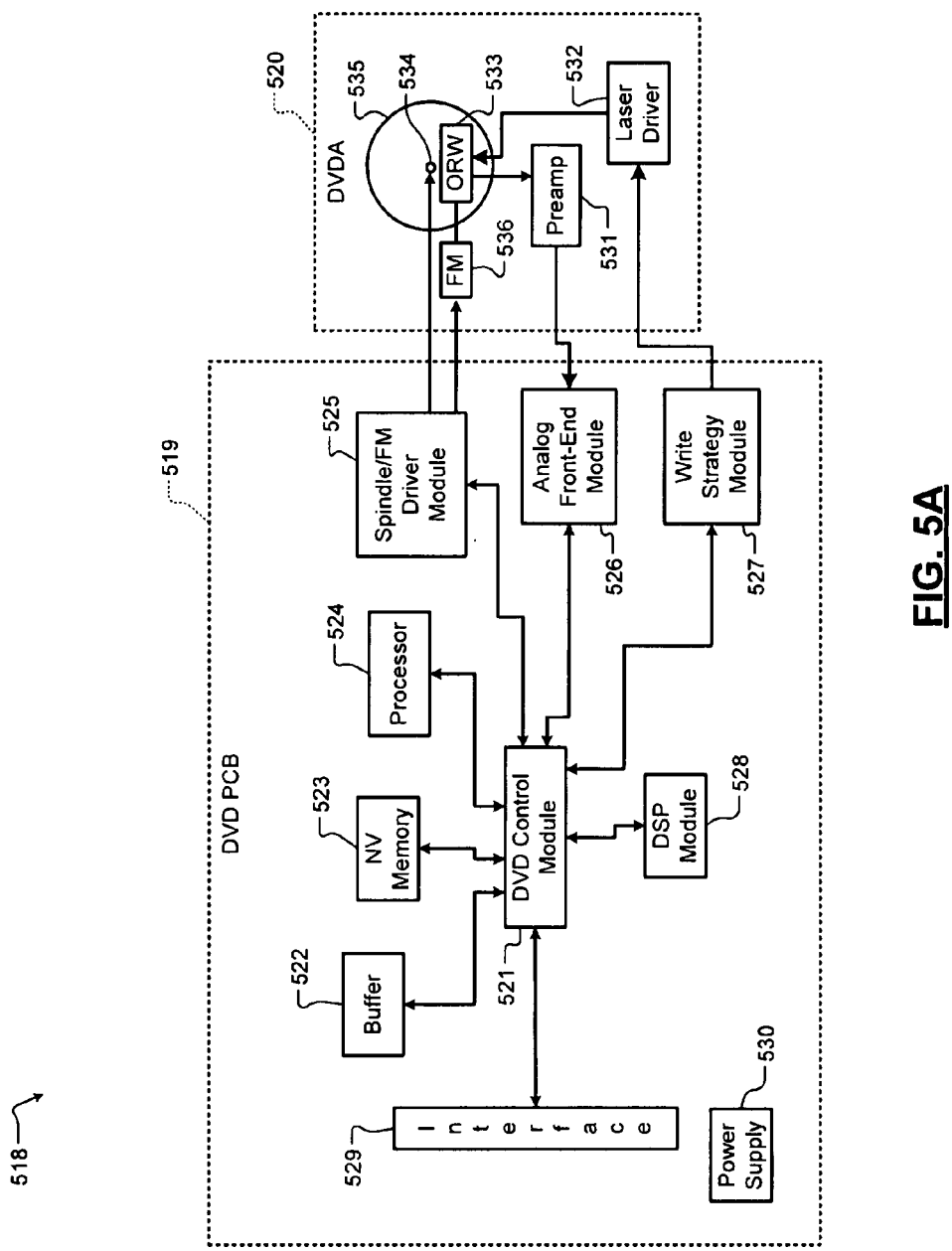
FIG. 5A is a functional block diagram of a DVD drive.

Referring now to FIG. 5A, the teachings of the disclosure can be implemented in a buffer 522 of a DVD drive 518 or of a CD drive (not shown). The DVD drive 518 includes a DVD PCB 519 and a DVD assembly (DVDA) 520. The DVD PCB 519 includes a DVD control module 521, the buffer 522, nonvolatile memory 523, a processor 524, a spindle/FM (feed motor) driver module 525, an analog front-end module 526, a write strategy module 527, and a DSP module 528.

The DVD control module 521 controls components of the DVDA 520 and communicates with an external device (not shown) via an I/O interface 529. The external device may include a computer, a multimedia device, a mobile computing device, etc. The I/O interface 529 may include wireline and/or wireless communication links.

The DVD control module 521 may receive data from the buffer 522, nonvolatile memory 523, the processor 524, the spindle/FM driver module 525, the analog front-end module 526, the write strategy module 527, the DSP module 528, and/or the I/O interface 529. The processor 524 may process the data, including encoding, decoding, filtering, and/or formatting. The DSP module 528 performs signal processing, such as video and/or audio coding/decoding. The processed data may be output to the buffer 522, nonvolatile memory 523, the processor 524, the spindle/FM driver module 525, the analog front-end module 526, the write strategy module 527, the DSP module 528, and/or the I/O interface 529.

The DVD control module 521 may use the buffer 522 and/or nonvolatile memory 523 to store data related to the control and operation of the DVD drive 518. The buffer 522 may include DRAM, SDRAM, etc. The nonvolatile memory 523 may include flash memory (including NAND and NOR flash memory), phase change memory, magnetic RAM, or multi-state memory, in which each memory cell has more than two states. The DVD PCB 519 includes a power supply 530 that provides power to the components of the DVD drive 518.

The DVDA 520 may include a preamplifier device 531, a laser driver 532, and an optical device 533, which may be an optical read/write (ORW) device or an optical read-only (OR) device. A spindle motor 534 rotates an optical storage medium 535, and a feed motor 536 actuates the optical device 533 relative to the optical storage medium 535.

When reading data from the optical storage medium 535, the laser driver provides a read power to the optical device 533. The optical device 533 detects data from the optical storage medium 535, and transmits the data to the preamplifier device 531. The analog front-end module 526 receives data from the preamplifier device 531 and performs such functions as filtering and A/D conversion. To write to the optical storage medium 535, the write strategy module 527 transmits power level and timing data to the laser driver 532. The laser driver 532 controls the optical device 533 to write data to the optical storage medium 535.

Figure 5C:
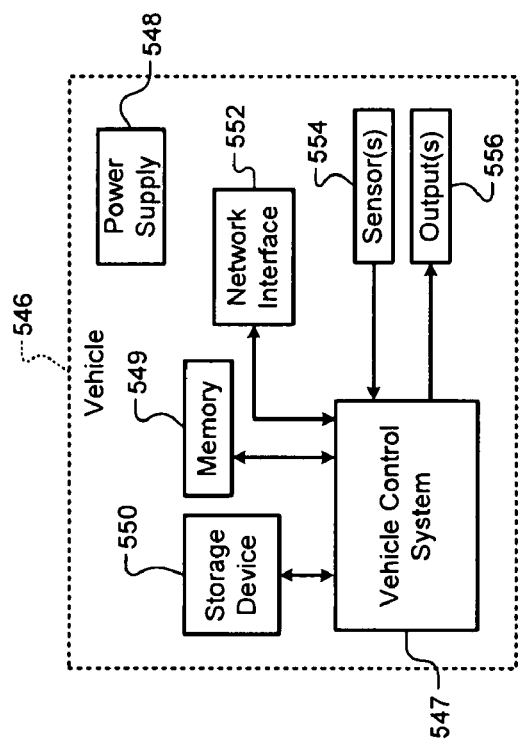
FIG. 5C is a functional block diagram of a vehicle control system.
Figure 5B:
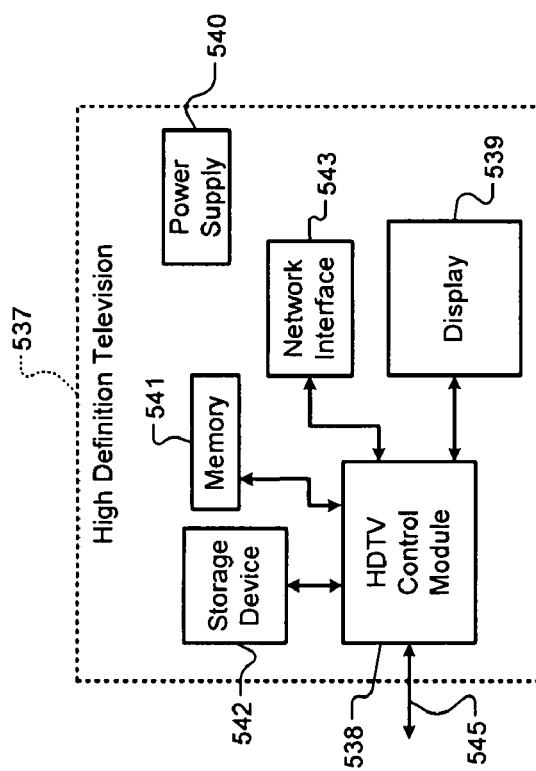
FIG. 5B is a functional block diagram of a high definition television.

Referring now to FIG. 5B, the teachings of the disclosure can be implemented in memory 541 of a high definition television (HDTV) 537. The HDTV 537 includes a HDTV control module 538, a display 539, a power supply 540, memory 541, a storage device 542, a network interface 543, and an external interface 545. If the network interface 543 includes a wireless local area network interface, an antenna (not shown) may be included.

The HDTV 537 can receive input signals from the network interface 543 and/or the external interface 545, which can send and receive data via cable, broadband Internet, and/or satellite. The HDTV control module 538 may process the input signals, including encoding, decoding, filtering, and/or formatting, and generate output signals. The output signals may be communicated to one or more of the display 539, memory 541, the storage device 542, the network interface 543, and the external interface 545.

Memory 541 may include random access memory (RAM) and/or nonvolatile memory such as flash memory, phase change memory, or multi-state memory, in which each memory cell has more than two states. The storage device 542 may include an optical storage drive, such as a DVD drive, and/or a hard disk drive (HDD). The HDTV control module 538 communicates externally via the network interface 543 and/or the external interface 545. The power supply 540 provides power to the components of the HDTV 537.

Referring now to FIG. 5C, the teachings of the disclosure may be implemented in memory 549 of a vehicle 546. The vehicle 546 may include a vehicle control system 547, a power supply 548, memory 549, a storage device 550, and a network interface 552. If the network interface 552 includes a wireless local area network interface, an antenna (not shown) may be included. The vehicle control system 547 may be a powertrain control system, a body control system, an entertainment control system, an anti-lock braking system (ABS), a navigation system, a telematics system, a lane departure system, an adaptive cruise control system, etc.

The vehicle control system 547 may communicate with one or more sensors 554 and generate one or more output signals 556. The sensors 554 may include temperature sensors, acceleration sensors, pressure sensors, rotational sensors, airflow sensors, etc. The output signals 556 may control engine operating parameters, transmission operating parameters, suspension parameters, etc.

The power supply 548 provides power to the components of the vehicle 546. The vehicle control system 547 may store data in memory 549 and/or the storage device 550. Memory 549 may include random access memory (RAM) and/or nonvolatile memory such as flash memory, phase change memory, or multi-state memory, in which each memory cell has more than two states. The storage device 550 may include an optical storage drive, such as a DVD drive, and/or a hard disk drive (HDD). The vehicle control system 547 may communicate externally using the network interface 552.

Figure 5E:
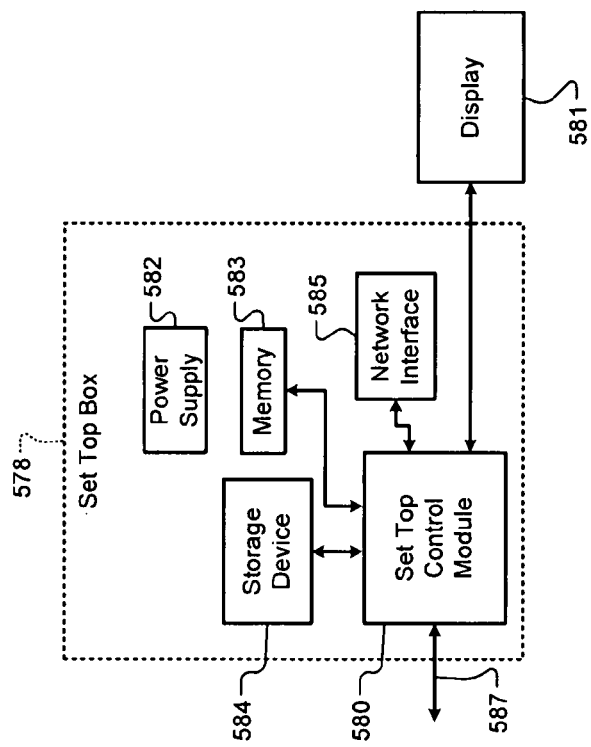
FIG. 5E is a functional block diagram of a set top box.
Figure 5D:
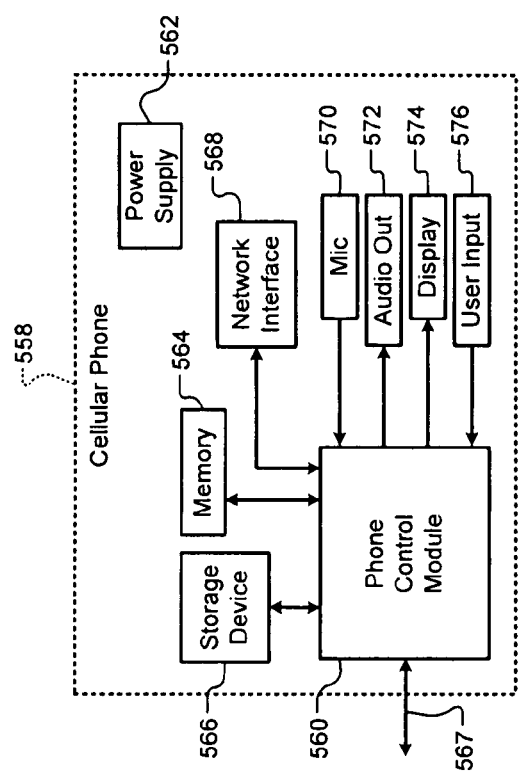
FIG. 5D is a functional block diagram of a cellular phone.

Referring now to FIG. 5D, the teachings of the disclosure can be implemented in a memory 564 of a cellular phone 558. The cellular phone 558 includes a phone control module 560, a power supply 562, memory 564, a storage device 566, and a cellular network interface 567. The cellular phone 558 may include a network interface 568, a microphone 570, an audio output 572 such as a speaker and/or output jack, a display 574, and a user input device 576 such as a keypad and/or pointing device. If the network interface 568 includes a wireless local area network interface, an antenna (not shown) may be included.

The phone control module 560 may receive input signals from the cellular network interface 567, the network interface 568, the microphone 570, and/or the user input device 576. The phone control module 560 may process signals, including encoding, decoding, filtering, and/or formatting, and generate output signals. The output signals may be communicated to one or more of memory 564, the storage device 566, the cellular network interface 567, the network interface 568, and the audio output 572.

Memory 564 may include random access memory (RAM) and/or nonvolatile memory such as flash memory, phase change memory, or multi-state memory, in which each memory cell has more than two states. The storage device 566 may include an optical storage drive, such as a DVD drive, and/or a hard disk drive (HDD). The power supply 562 provides power to the components of the cellular phone 558.

Referring now to FIG. 5E, the teachings of the disclosure can be implemented in memory 583 of a set top box 578. The set top box 578 includes a set top control module 580, a display 581, a power supply 582, memory 583, a storage device 584, and a network interface 585. If the network interface 585 includes a wireless local area network interface, an antenna (not shown) may be included.

The set top control module 580 may receive input signals from the network interface 585 and an external interface 587, which can send and receive data via cable, broadband Internet, and/or satellite. The set top control module 580 may process signals, including encoding, decoding, filtering, and/or formatting, and generate output signals. The output signals may include audio and/or video signals in standard and/or high definition formats. The output signals may be communicated to the network interface 585 and/or to the display 581. The display 581 may include a television, a projector, and/or a monitor.

The power supply 582 provides power to the components of the set top box 578. Memory 583 may include random access memory (RAM) and/or nonvolatile memory such as flash memory, phase change memory, or multi-state memory, in which each memory cell has more than two states. The storage device 584 may include an optical storage drive, such as a DVD drive, and/or a hard disk drive (HDD).

Figure 5F:
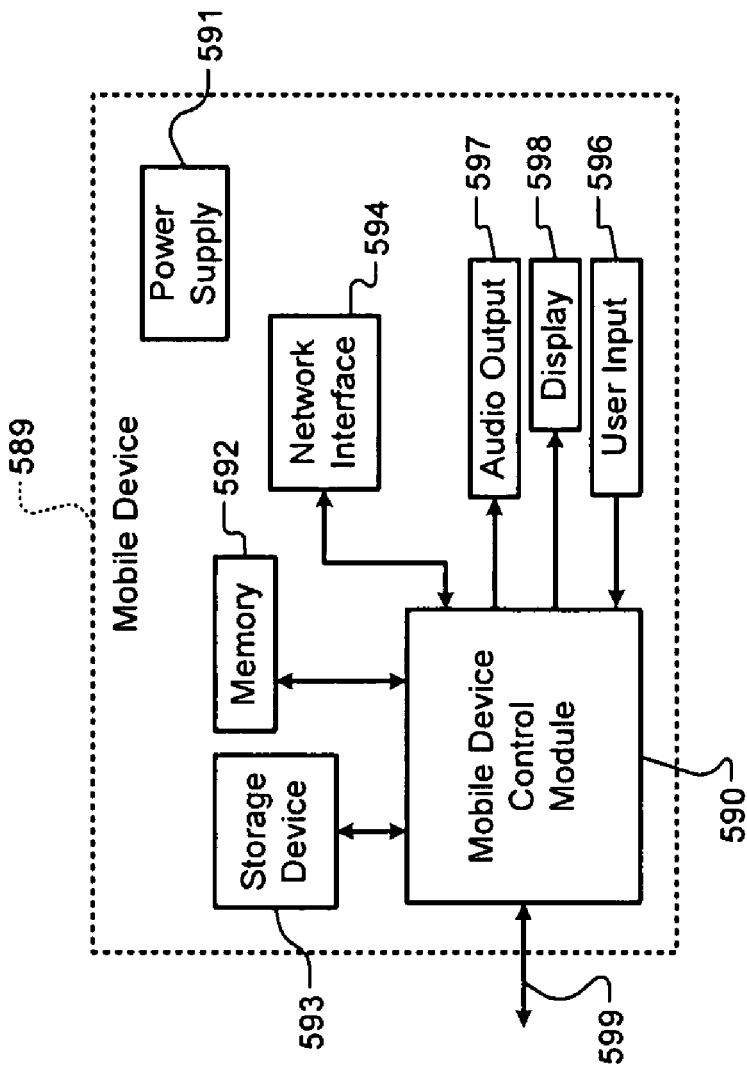
FIG. 5F is a functional block diagram of a mobile device.

Referring now to FIG. 5F, the teachings of the disclosure can be implemented in memory 592 of a mobile device 589. The mobile device 589 may include a mobile device control module 590, a power supply 591, memory 592, a storage device 593, a network interface 594, and an external interface 599. If the network interface 594 includes a wireless local area network interface, an antenna (not shown) may be included.

The mobile device control module 590 may receive input signals from the network interface 594 and/or the external interface 599. The external interface 599 may include USB, infrared, and/or Ethernet. The input signals may include compressed audio and/or video, and may be compliant with the MP3 format. Additionally, the mobile device control module 590 may receive input from a user input 596 such as a keypad, touchpad, or individual buttons. The mobile device control module 590 may process input signals, including encoding, decoding, filtering, and/or formatting, and generate output signals.

The mobile device control module 590 may output audio signals to an audio output 597 and video signals to a display 598. The audio output 597 may include a speaker and/or an output jack. The display 598 may present a graphical user interface, which may include menus, icons, etc. The power supply 591 provides power to the components of the mobile device 589. Memory 592 may include random access memory (RAM) and/or nonvolatile memory such as flash memory, phase change memory, or multi-state memory, in which each memory cell has more than two states. The storage device 593 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of operating a memory integrated circuit (IC), comprising:
providing a first memory on the memory IC;

using an operation management module to initialize the first memory with first initialization data that is predefined before other data is stored in the first memory; and adjusting timing alignment for reading the other data from the first memory by comparing the first initialization data to second initialization data stored in a second memory that is not implemented by the memory IC.

2. The method of claim 1 further comprising:
receiving a request for a read operation; and
reading and transmitting the first initialization data to a memory controller module in response to the request.

3. The method of claim 1 further comprising generating the first initialization data after an initialization event.

4. The method of claim 3 wherein the initialization event includes one of a power-up event and a reset event.

5. The method of claim 1 further comprising disposing the operation management module on the memory IC.

6. The method of claim 1 further comprising predefining the first initialization data without synchronization with a device external to the memory IC.

7. A method of operating a memory integrated circuit (IC), comprising:
providing a first memory on the memory IC;
initializing the first memory with predefined first initialization data using an operation management module before other data is stored in the first memory; and
storing the predefined first initialization data on a memory control module that is external to the memory IC.

8. A memory integrated circuit (IC), comprising:
first memory disposed on the memory IC;
an operation management module configured to initialize the first memory with predefined first initialization data to cause the first memory to be pre-loaded with the first initialization data, the first initialization data being predefined and pre-loaded before other data is stored in the first memory; and
a memory control module external to the memory IC that stores the predefined first initialization data.

9. The memory IC of claim 8 wherein:
the memory controller module is configured to adjust timing alignment for reading the other data from the first memory based on a reading of the first initialization data from the first memory; and
the other data is stored in the first memory after the timing alignment is adjusted, and is transmitted from the memory IC based on the timing alignment.

10. The memory IC of claim 8 wherein the operation management module reads and transmits the first initialization data to the memory controller module when the operation management module receives a request for a read operation.

11. The memory IC of claim 8 wherein the operation management module generates the first initialization data after an initialization event.

12. The memory IC of claim 11 wherein the initialization event includes one of a power-up event and a reset event.

13. The memory IC of claim 8 wherein the operation management module is disposed on the memory IC.

14. The memory IC of claim 8 wherein the first initialization data is predefined without synchronization with a device external to the memory IC.

* * * * *